(12) United States Patent
Shimodaira

(10) Patent No.: US 10,220,513 B2
(45) Date of Patent: Mar. 5, 2019

(54) ROBOT CONTROL APPARATUS, ROBOT AND ROBOT SYSTEM

(71) Applicant: Seiko Epson Corporation, Tokyo (JP)

(72) Inventor: Yasuhiro Shimodaira, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/653,953

(22) Filed: Jul. 19, 2017

(65) Prior Publication Data
US 2018/0021950 A1 Jan. 25, 2018

(30) Foreign Application Priority Data
Jul. 22, 2016 (JP) .................. 2016-144626

(51) Int. Cl.
*B25J 5/00* (2006.01)
*B25J 9/16* (2006.01)
(Continued)

(52) U.S. Cl.
CPC ............. *B25J 9/1633* (2013.01); *B25J 13/02* (2013.01); *B25J 13/085* (2013.01); *B25J 15/10* (2013.01); *G05B 19/04* (2013.01); *G05B 19/4086* (2013.01); *G05B 19/425* (2013.01); *G05B 19/00* (2013.01); *G05B 2219/39322* (2013.01);
(Continued)

(58) Field of Classification Search
CPC ........ G05B 19/401; G05B 2219/39529; G05B 2219/40599; G05B 2219/45058; G05B 2219/45064; G05B 11/01; G05B 19/402; G05B 19/10; G05B 19/04; B25J 13/08; B25J 9/16; B25J 9/1694; B25J 13/085; B25J 9/1692; B25J 5/00; Y10S 901/02; H02P 1/00; H02P 3/00; H02P 6/00;
(Continued)

(56) References Cited

U.S. PATENT DOCUMENTS

| 6,141,863 A * | 11/2000 | Hara .................. B25J 9/1633 29/714 |
| 6,553,652 B2 * | 4/2003 | Sakakibara ........... B25J 9/1633 29/709 |

(Continued)

FOREIGN PATENT DOCUMENTS

| JP | 08-194521 A | 7/1996 |
| JP | 2014-166681 A | 9/2014 |

(Continued)

*Primary Examiner* — Antony M Paul
(74) *Attorney, Agent, or Firm* — Harness, Dickey & Pierce, P.L.C.

(57) ABSTRACT

A robot control apparatus that controls a robot having a movable part provided with a force detection unit includes a robot control part that performs force control on the movable part based on output of the force detection unit, wherein, when an insertion job of moving at least one of a first object and a second object having an insertion portion and inserting the first object into the insertion portion is performed by the movable part, the robot control part performs the force control on the movable part at least in a part of the insertion job, and a first target force of the force control for the movable part to position the first object in a first position and a second target force of the force control for the movable part to position the first object in a second position different from the first position are different.

20 Claims, 9 Drawing Sheets

(51) Int. Cl.
*B25J 13/02* (2006.01)
*G05B 19/04* (2006.01)
*G05B 19/408* (2006.01)
*G05B 19/425* (2006.01)
*B25J 13/08* (2006.01)
*B25J 15/10* (2006.01)
*G05B 19/00* (2006.01)

(52) U.S. Cl.
CPC ............ *G05B 2219/40032* (2013.01); *G05B 2219/40087* (2013.01)

(58) Field of Classification Search
CPC .... H02P 1/46; H02P 3/18; H02P 41/00; H02P 27/04; H02P 27/06; H02P 23/00; H02P 27/00
USPC .............. 901/5, 8, 9, 19, 23, 27, 30, 32, 34; 318/560, 568.11, 568.12, 625, 628, 318/400.01, 400.14, 400.15, 700, 701, 318/727, 799, 800, 801, 430, 432
See application file for complete search history.

(56) References Cited

U.S. PATENT DOCUMENTS

| | | |
|---|---|---|
| 9,138,893 B2 | 9/2015 | Nagai et al. |
| 9,283,048 B2* | 3/2016 | Kostrzewski .......... A61B 34/30 |
| 2015/0174760 A1* | 6/2015 | Fukuda .................. B25J 9/1687 700/260 |
| 2016/0052135 A1 | 2/2016 | Motoyoshi et al. |

FOREIGN PATENT DOCUMENTS

| | | |
|---|---|---|
| JP | 2016-043457 A | 4/2016 |
| JP | 2016-221646 A | 12/2016 |

* cited by examiner

| STANDARD | MALE SIDE TOP VIEW | MALE SIDE FRONT VIEW | FEMALE SIDE FRONT VIEW | NECESSARY INSERTION PRESSURE [N] | GRASPING PRESSURE [N] |
|---|---|---|---|---|---|
| USB TYPE-A | | | | ≥ 10 | 10.3 |
| HDMI | | | | 9.8 - 39.2 | 14 |

FIG. 4

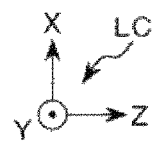
FIG. 8
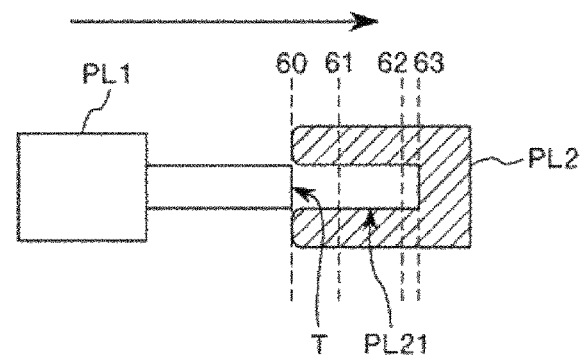
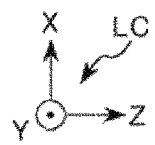
FIG. 9
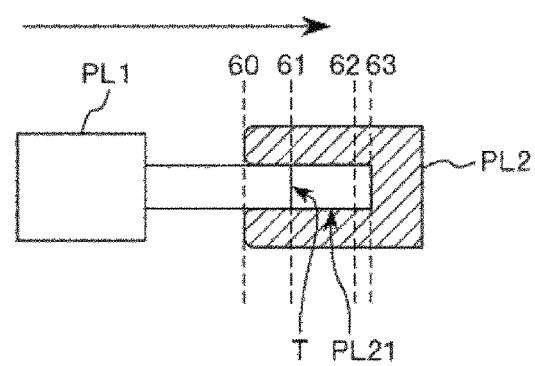
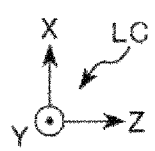
FIG. 10
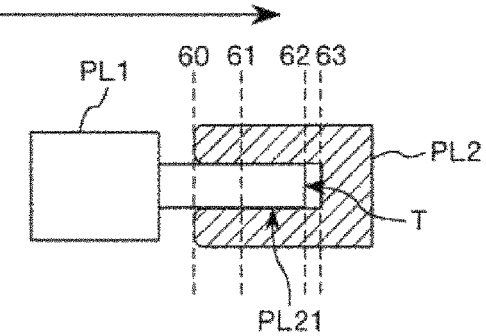
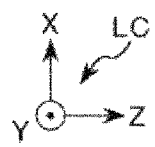
FIG. 11
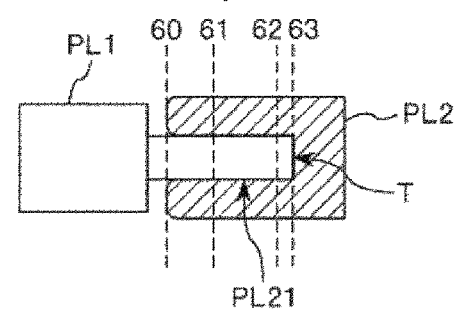

ROBOT CONTROL APPARATUS, ROBOT AND ROBOT SYSTEM

BACKGROUND

1. Technical Field

The present invention relates to a robot control apparatus, a robot and a robot system.

2. Related Art

Research and development of robots that perform a job of inserting one of two objects into an insertion portion of the other are carried out.

In this regard, a robot that performs a fitting job of fitting a first work in a second work by three actions of a contact action of bringing the first work into contact with the second work, an exploration action of exploring the shape of the second work using the first work, and an insertion action of inserting the first work into the second work is known (see Patent Document 1 (JP-A-2014-166681)).

However, in the robot disclosed in Patent Document 1, there is a problem that a long time is required for the fitting job.

Further, Patent Document 1 does not disclose how to set a local coordinate system. Depending on how to set the local coordinate system, teaching may be difficult and the time taken for teaching may be longer.

SUMMARY

An advantage of some aspects of the invention is to solve at least a part of the problems described above, and the invention can be implemented as the following forms or application examples.

A robot control apparatus according to an aspect of the invention is a robot control apparatus that controls a robot having a movable part in which a force detection unit is provided, and includes a robot control part that performs force control on the movable part based on output of the force detection unit, wherein, when an insertion job of moving at least one of a first object and a second object having an insertion portion and inserting the first object into the insertion portion is performed by the movable part, the robot control part performs the force control on the movable part at least in a part of the insertion job, and a first target force of the force control for the movable part to position the first object in a first position and a second target force of the force control for the movable part to position the first object in a second position different from the first position are different.

With this configuration, the insertion job of inserting the first object into the insertion portion may be quickly performed.

In the robot control apparatus according to the aspect of the invention, it is preferable to include a position setting part that sets the first position and the second position.

With this configuration, various kinds of insertion jobs may be handled and the insertion jobs may be quickly performed.

In the robot control apparatus according to the aspect of the invention, it is preferable to include a target force setting part that sets the first target force and the second target force.

With this configuration, various kinds of insertion jobs may be handled and the insertion jobs may be quickly performed.

In the robot control apparatus according to the aspect of the invention, it is preferable to perform the force control and position control in at least apart of the insertion job.

With this configuration, for example, a part for which force control and position control are performed, apart for which force control is performed, and a part for which position control is performed are provided according to conditions, and the insertion job may be quickly performed.

In the robot control apparatus according to the aspect of the invention, it is preferable that the second position is located in a positive direction of an insertion direction of the first object with respect to the first position, and the second target force is larger than the first target force.

With this configuration, the movement to the second position may be performed at a high speed, and the insertion job may be quickly performed.

In the robot control apparatus according to the aspect of the invention, it is preferable that a force that cancels a force subjected to the first object from the insertion portion is added to a target force of the force control in at least a part of the insertion job.

With this configuration, the insertion action may be smoothly performed, the insertion action may be performed at a higher speed with a smaller force, and the insertion action may be quickly performed.

In the robot control apparatus according to the aspect of the invention, it is preferable to include a coordinate system setting part that sets a coordinate system having an axis along an insertion direction of the first object.

With this configuration, times taken for teaching by a worker and times for confirmation of teaching results may be shortened.

In the robot control apparatus according to the aspect of the invention, it is preferable to include a display control part that displays output of the force detection unit and a trajectory of the movable part in a display unit.

With this configuration, the output of the force detection part and the trajectory of the movable part may be visually recognized at teaching, adjustment, actual action of the robot, and the convenience is high.

In the robot control apparatus according to the aspect of the invention, it is preferable that, in the insertion job, when moving at least one of the first object and the second object in a direction in which the first object and the second object come closer using the movable part and determining that the first object has come into contact with a position different from the insertion portion based on output of the force detection unit, the robot control part moves at least one of the first object and the second object in a direction in which the first object and the second object separate using the movable part.

With this configuration, when the first object comes into contact with a position different from the insertion portion, damage and deformation of the first object and the second object may be suppressed.

In the robot control apparatus according to the aspect of the invention, it is preferable that the robot control part performs control on the movable part based on insertion positions in which insertion of the first object into the insertion portion was successful and the number of successful times.

With this configuration, for example, the insertion job may be quickly performed by an attempt to perform the insertion job in the insertion position in which the insertion was successful at many times as the target position.

A robot according to an aspect of the invention includes a movable part in which a force detection unit is provided, and is controlled by the robot control apparatus according to the aspect of the invention.

With this configuration, the insertion job of inserting the first object into the insertion portion may be quickly performed.

A robot system according to an aspect of the invention includes the robot control apparatus according to the aspect of the invention, and the robot controlled by the robot control apparatus.

With this configuration, the insertion job of inserting the first object into the insertion portion may be quickly performed.

BRIEF DESCRIPTION OF THE DRAWINGS

The invention will be described with reference to the accompanying drawings, wherein like numbers reference like elements.

FIG. 4 shows specific examples of standards of the connector PL1 and a connector PL2.

FIG. 8 is a diagram for explanation of the action of the robot in the insertion job.

FIG. 9 is a diagram for explanation of the action of the robot in the insertion job.

FIG. 10 is a diagram for explanation of the action of the robot in the insertion job.

FIG. 11 is a diagram for explanation of the action of the robot in the insertion job.

DESCRIPTION OF EXEMPLARY EMBODIMENTS

As below, a robot control apparatus, a robot and a robot system according to the invention will be explained in detail based on embodiments shown in the accompanying drawings.

Configuration of Robot System

First, a configuration of a robot system 1 will be explained.

Figure 1:
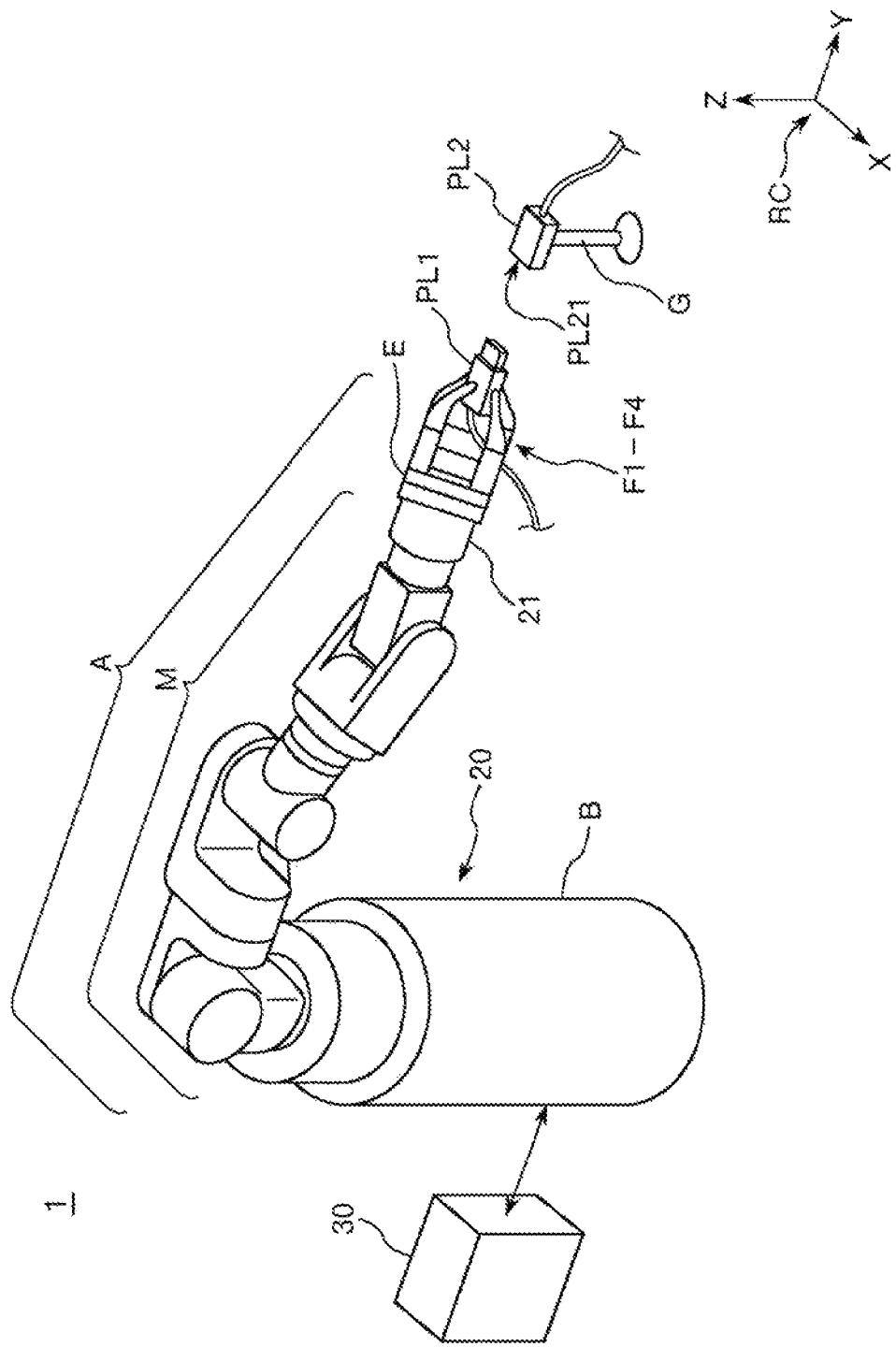
FIG. 1 is a perspective view showing an embodiment of a robot system of the invention.

FIG. 1 is a perspective view showing an embodiment of the robot system according to the invention.

Note that, hereinafter, X-axis directions and directions parallel to an X-axis in a coordinate system are also referred to as "X-directions", and the positive direction of the X-directions is referred to as "X-direction plus side" and the negative direction of the X-directions is referred to as "X-direction minus side". Further, Y-axis directions and directions parallel to a Y-axis in the coordinate system are also referred to as "Y-directions", and the positive direction of the Y-directions is referred to as "Y-direction plus side" and the negative direction of the Y-directions is referred to as "Y-direction minus side". Furthermore, Z-axis directions and directions parallel to a Z-axis in the coordinate system are also referred to as "Z-directions", and the positive direction of the Z-directions is referred to as "Z-direction plus side" and the negative direction of the Z-directions is referred to as "Z-direction minus side".

As shown in FIG. 1, the robot system 1 includes a robot 20 and a robot control apparatus 30 that controls the robot 20. The robot 20 is controlled by the robot control apparatus 30.

The robot 20 has an arm A (manipulator M) in which a force detection unit 21 is provided as an example of a movable part in which a force detection unit is provided, and a support B (base) that supports the arm A.

Note that the force detection unit 21 may be included in component elements of the arm A or not. In the following explanation, the case where the unit is included in the component elements will be described. Further, it is only necessary that at least a part of the force detection unit 21 is provided in the arm A. That is, a part of the force detection unit 21 may be provided in the arm A or all of the force detection unit 21 may be provided in the arm A. In the following explanation, the case where all of the force detection unit 21 is provided in the arm A will be described.

Further, the robot 20 is a single-arm robot, specifically, a vertical articulated (seven-axis) single-arm robot. The single-arm robot is a robot having a single arm like the arm A in the example. Note that the robot 20 may be a multi-arm robot in place of the single-arm robot. The multi-arm robot is a robot having two or more arms (e.g. two or more arms A). Of the multi-arm robots, a robot having two arms is also called a dual-arm robot. That is, the robot 20 may be a dual-arm robot having two arms or a multi-arm robot having three or more arms (e.g. three or more arms A). Or, the robot 20 may be another robot including a horizontal articulated robot such as a scalar robot, a Cartesian coordinate robot, and a legged walking (running) robot having leg parts. The Cartesian coordinate robot is e.g. a gantry robot.

The arm A includes an end effector E, the manipulator M, and the force detection unit 21.

The end effector E is an end effector having a finger part that can grasp an object in the example. The finger part includes two or more fingers. As below, as an example, the case where the finger part includes four fingers of finger F1 to finger F4 will be explained. The end effector E grasps an object by pinching the object using the respective fingers F1 to F4. Note that the end effector E may be another end effector that can lift an object using a magnet, a jig, or the like in place of the end effector having the finger part.

The finger part of the end effector E is communicably connected to the robot control apparatus 30 by a cable. Thereby, the finger part allows the respective fingers F1 to F4 to act according to control signals acquired from the robot control apparatus 30. Wired communications via the cable are performed according to standards of e.g. Ethernet®, USB (Universal Serial Bus), or the like. Or, the finger part may be adapted to be connected to the robot control apparatus 30 via wireless communications performed according to communication standards of Wi-Fi® or the like.

The manipulator M has seven links and seven joints. Further, each of the seven joints has an actuator (not shown). That is, the arm A having the manipulator M is a seven-axis vertical articulated arm. Specifically, the support B and the links are coupled via the joint and the joint has a mechanism of rotatably supporting the links coupled to each other with respect to the support B. Further, the adjacent two links are similarly coupled via the joints and the joints have mechanisms of rotatably supporting one link of the links coupled to each other with respect to the other link. The arm A performs actions at the degree of freedom of seven axes by cooperative motion of the support B, the end effector E, the manipulator M, and the respective actuators of the seven joints of the manipulator M. Note that the arm A may be adapted to act at the degree of freedom of six or less axes or act at the degree of freedom of eight or more axes.

When the arm A acts at the degree of freedom of seven axes, the number of attitudes that can be taken is larger than that in the case where the arm A acts at the degree of freedom of six or less axes. Thereby, the arm A may smoothly move and easily avoid interferences with objects existing around the arm A, for example. Further, when the arm A acts at the degree of freedom of seven axes, control of the arm A is easier than that in the case where the arm A acts at the degree of freedom of eight or more axes because the calculation amount is less.

The respective actuators of the seven joints of the manipulator M are respectively communicably connected to the robot control apparatus 30 by cables. Thereby, the respective actuators operate the manipulator M based on the control signals acquired from the robot control apparatus 30. Wired communications via the cables are performed according to standards of e.g. Ethernet®, USB, or the like. Or, part or all of the seven actuators of the manipulator M may be adapted to be connected to the robot control apparatus via wireless communications performed according to communication standards of Wi-Fi® or the like.

The force detection unit 21 is provided between the end effector E and the manipulator M. The force detection unit 21 includes e.g. a force sensor. The force sensor is not particularly limited, but various kinds of sensors including e.g. a six-axis force sensor that detects forces in the respective axis directions of the three axes orthogonal to each other and moment about the respective axes may be used. The force detection unit 21 detects force and moment (torque) acting on the end effector E or an object grasped by the end effector E. The force detection unit 21 outputs force detection information containing a value indicating the magnitude of the detected force or moment as an output value to the robot control apparatus 30 via communications.

The force detection information is used for control based on the force detection information of the control of the arm A by the robot control apparatus 30. The control based on the force detection information refers to e.g. force control such as impedance control (compliant motion control).

The force detection unit 21 is communicably connected to the robot control apparatus 30 by a cable. Wired communications via the cable are performed according to standards of e.g. Ethernet®, USB, or the like. Note that the force detection unit 21 and the robot control apparatus 30 may be adapted to be connected via wireless communications performed according to communication standards of Wi-Fi® or the like.

Note that the robot 20 may include one or more imaging units in addition to the above described functional parts. As below, the case of the robot 20 without the imaging unit will be explained as an example.

The robot control apparatus 30 is a robot controller in the example. The robot control apparatus 30 generates control signals based on an operation program input in advance. The robot control apparatus 30 transmits the generated control signals to the robot 20 to allow the robot 20 to perform predetermined jobs. As below, for convenience of explanation, the explanation of the generation and transmission of the control signals by the robot control apparatus 30 will be omitted and actions that the robot control apparatus 30 allows the robot 20 to perform and processing that the robot control apparatus 30 performs when operating the robot 20 will be explained. Note that part or all of the robot control apparatus 30 may be built in the robot 20 instead of being separated from the robot 20 and provided outside of the robot 20 as shown in FIG. 1.

Outline of Insertion Job Performed by Robot

As below, an outline of an example of an insertion job performed by the robot 20 in the embodiment will be explained.

The robot 20 performs an insertion job of pinching and grasping a first object from a gravity direction and an opposite direction to the gravity direction and inserting the first object into an insertion portion of a second object. Note that the robot 20 may pinch and grasp the first object from different directions.

In the embodiment, as an example, the case where a negative direction of a Z-axis in a robot coordinate system RC coincides with the gravity direction is explained. The robot coordinate system RC is a three-dimensional local coordinate system as reference when the robot control apparatus 30 moves the arm A. Note that the negative direction of the Z-axis in the robot coordinate system RC may coincide with a direction different from the gravity direction.

In the embodiment, as an example, the case where the first object is a male connector (plug or jack) PL1 in a connecting cable for communications is explained. Note that the first object may be an industrial component, member, device, or the like or a living organism or the like in place of the connector PL1.

Further, in the embodiment, as an example, the case where the second object is a female connector (receptacle) PL2 in a connecting cable for communications to be connected to the male connector PL1 as the example of the first object is explained. In this case, the connector PL2 includes an insertion portion PL21 as an insertion portion of the above described second embodiment. Note that the second object may be an industrial component, member, device, or the like or a living organism or the like in place of the connector PL2.

In the embodiment, as an example, the connector PL2 is supported by a jig G provided on the contact surface (e.g. floor surface) of the robot 20. Note that the connector PL2 may be supported by a jig G provided in another position such as a wall surface or ceiling surface.

Here, referring to FIGS. 2 and 3, a method of grasping the connector PL1 by the end effector E of the robot 20 will be explained.

Figure 2:
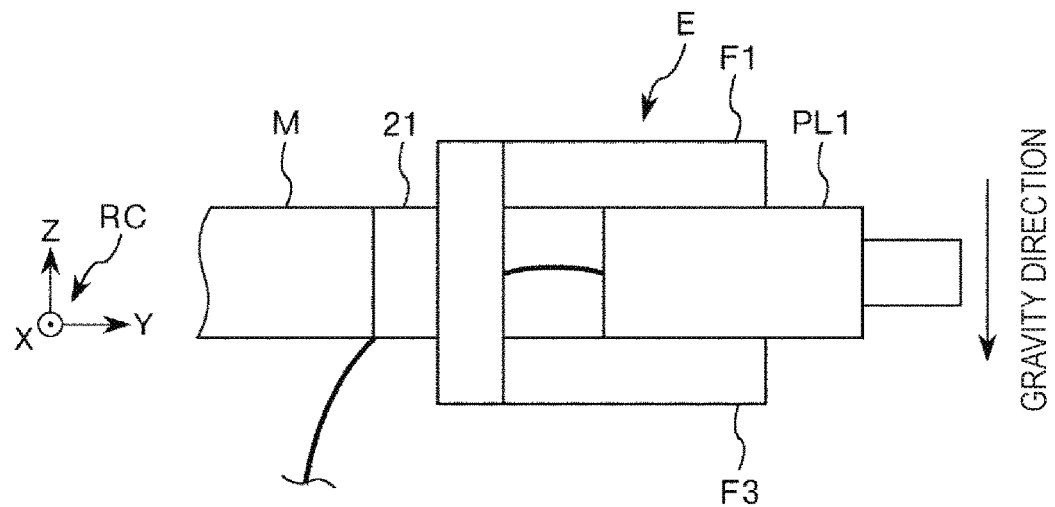
FIG. 2 is a side view showing an example when a connector PL1 grasped by an end effector is seen from a positive direction in a negative direction of an X-axis in a robot coordinate system.

FIG. 2 is a side view showing an example when the connector PL1 grasped by the end effector is seen from a positive direction in a negative direction of an X-axis in the robot coordinate system. The side view is a side view when the rotation axis of the joint that rotates the end effector E of the joints of the manipulator M and a Y-axis in the robot coordinate system RC coincide. Further, in FIG. 2, for clarification of a relative position relationship between the fingers F1 and F3 and the connector PL1, the fingers F2 and F4 are omitted.

As shown in FIG. 2, the end effector E operates the respective fingers F1 and F3 to pinch the connector PL1 from the gravity direction and the opposite direction to the gravity direction, and thereby, grasps the connector PL1. As described above, in the example, the gravity direction is the negative direction of the Z-axis in the robot coordinate system RC. That is, the end effector E moves the finger F1 in the gravity direction closer to the connector PL1 and moves the finger F3 in the opposite direction closer to the connector PL1, and thereby, pinches the connector PL1 by the finger F1 and the finger F3 and grasps the connector PL1. Accordingly, in the example shown in FIG. 2, the finger F1 is in contact with the part on the positive direction side of the Z-axis of the parts of the connector PL1, and the finger F3 is in contact with the part on the negative direction side of the Z-axis of the parts of the connector PL1.

Thereby, the robot 20 may suppress a shift in the gravity direction of the relative position relationship between the end effector E as apart that pinches the connector PL1 of the parts of the robot 20 and the connector PL1 due to the weight of the connector PL1 and the weight of the cable of the connector PL1. In the case where the position relationship does not shift in the gravity direction, the robot 20 may omit the action along the gravity direction of the actions of exploring the insertion portion PL21 when inserting the connector PL1 into the insertion portion PL21. As a result, the robot 20 may shorten the time to insert the connector PL1 into the insertion portion PL21 of the connector PL2.

Figure 3:
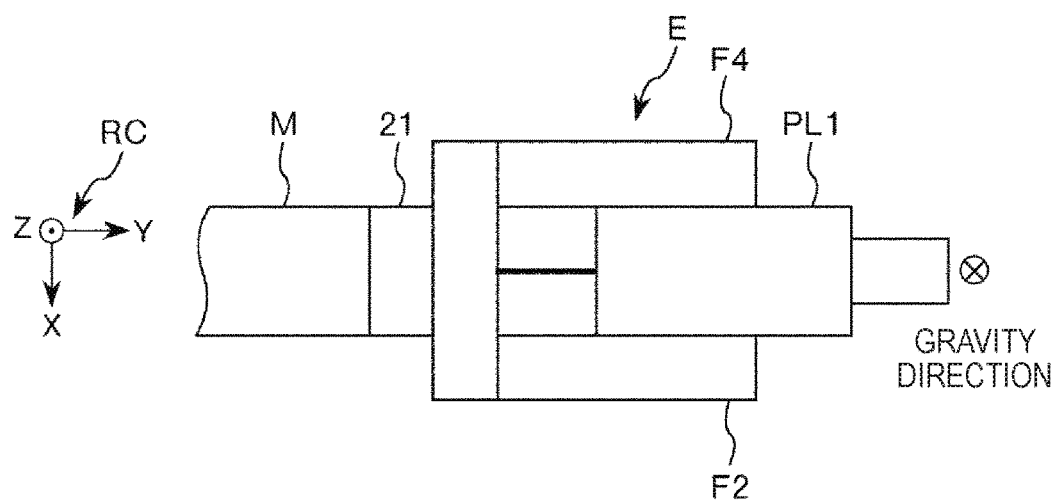
FIG. 3 is a top view of the end effector and the connector PL1 shown in FIG. 2 seen from a positive direction in a negative direction of Z-axis directions in the robot coordinate system RC.

FIG. 3 is a top view of the end effector and the connector PL1 shown in FIG. 2 seen from the positive direction in the negative direction of Z-axis directions in the robot coordinate system. In FIG. 3, for clarification of a relative position relationship between the fingers F2 and F4 and the connector PL1, the fingers F1 and F3 are omitted.

As shown in FIG. 3, the end effector E operates the respective fingers F2 and F4 to grasp the connector PL1 in a restricted state in directions orthogonal to the gravity direction. In the example shown in FIG. 3, the end effector E moves the finger F2 in the negative direction of the X-axis of the directions orthogonal to the gravity direction closer to the connector PL1 and moves the finger F4 in the positive direction of the X-axis of the directions orthogonal to the gravity direction closer to the connector PL1, and thereby, pinches the connector PL1 by the finger F2 and the finger F4 and realizes the restricted state of the connector PL1 in the directions orthogonal to the gravity direction. Accordingly, in the example shown in FIG. 3, the finger F2 is in contact with the part on the positive direction side of the X-axis of the parts of the connector PL1, and the finger F4 is in contact with the part on the negative direction side of the X-axis of the parts of the connector PL1.

Thereby, the robot 20 may suppress a shift in the gravity direction of the relative position relationship between the end effector E as the part that pinches the connector PL1 of the parts of the robot 20 and the connector PL1 and suppress a shift in the directions orthogonal to the gravity direction of the position relationship. In the case where the position relationship does not shift in the direction, the robot 20 may further omit an action in a direction along the direction of the actions of exploring the insertion portion PL21 when inserting the connector PL1 into the insertion portion PL21. As a result, the robot 20 may further shorten the time to insert the connector PL1 into the insertion portion PL21 of the connector PL2.

In the example shown in FIG. 1, as shown in FIG. 2 and FIG. 3, the robot 20 grasps the connector PL1 in advance with the fingers F1 to F4 in a fixed state in which the connector PL1 is pinched from the gravity direction and an opposite direction to the gravity direction and the connector PL1 is restricted in the directions orthogonal to the gravity direction. Note that the robot 20 may be adapted to grasp the connector PL1 placed in a predetermined feed region in the fixed state instead of grasping connector PL1 in advance. Or, the robot 20 may be adapted to perform another job. Or, the fixed state may be a state in which the robot 20 does not restrict the connector PL1 in the directions orthogonal to the gravity direction, but pinches the connector PL1 from the gravity direction and the opposite direction to the gravity direction. Or, the fixed state may be a state in which the robot 20 pinches the connector PL1 in both positive and negative directions of the directions orthogonal to the gravity direction, but does not restrict the connector PL1 in the gravity direction.

Description of Attention Point

As below, as an example, the case where the connector PL2 is supported by the jig G so that the positive direction of the Y-axis in the robot coordinate system RC and the positive direction of the insertion direction of the connector PL1 into the insertion portion PL21 may coincide. In other words, in the example, the opposite direction to the direction in which the connector PL1 inserted into the insertion portion PL21 is pulled from the insertion portion PL21 coincides with the positive direction of the Y-axis. Note that the connector PL2 may be adapted to be supported by the jig G so that the positive direction of the insertion direction of the connector PL1 into the insertion portion PL21 may coincide with another direction different from the positive direction of the Y-axis.

Further, in the example, at the center of an end portion of the connector PL1, an attention point T moving with the center is set. The end portion of the connector PL1 refers to an end portion on the side inserted into the insertion portion PL21 of the end portions of the connector PL1. The end portion of the connector PL1 has a surface orthogonal to the Y-axis in the robot coordinate system RC in a state in which the connector PL1 is inserted into the insertion portion PL21 of the connector PL2 supported by the jig G. The shape of the surface is e.g. a rectangular shape. That is, the center of the end portion of the connector PL1 in the example refers to the center of the rectangle.

For the attention point T, an attention point coordinate system as a three-dimensional local coordinate system that represents the position and attitude of the connector PL1 is set. The origin of the attention point coordinate system indicates the position of the attention point T, i.e., the center of the end portion of the connector PL1. Further, directions of the respective coordinate axes in the attention point coordinate system indicate the attitude of the attention point T, i.e., the center of the end portion of the connector PL1. For example, for the attention point T, the attention point coordinate system is set so that a positive direction of a Z-axis in the attention point coordinate system may coincide with the positive direction of the Y-axis in the robot coordinate system RC and a positive direction of an x-axis in the attention point coordinate system may coincide with the positive direction of the X-axis in the robot coordinate system RC in the state in which the connector PL1 is inserted into the insertion portion PL21.

Specific Examples of Standards of Connectors

As below, referring to FIG. 4, specific examples of standards of the connector PL1 and the connector PL2 will be explained. FIG. 4 shows the specific examples of the standards of the connector PL1 and the connector PL2. As shown in FIG. 4, the standards of the connector PL1 and the connector PL2 are e.g. USB Type-A and HDMI (High-Definition Multimedia Interface®).

When the standard of the connector PL1 and the connector PL2 is USB Type-A, pressure necessary for insertion of the connector PL1 into the insertion portion PL21 of the connector PL2 is equal to or more than e.g. 10 N (newtons) (no upper limit). Further, grasping pressure as pressure necessary for the end effector E to grasp the connector PL1 for generating that pressure is e.g. 10.3 N.

Alternatively, when the standard of the connector PL1 and the connector PL2 is HDMI (registered trademark), pressure necessary for insertion of the connector PL1 into the insertion portion PL21 of the connector PL2 is e.g. from 9.8 N to 39.2 N. Further, grasping pressure as pressure necessary for the end effector E to grasp the connector PL1 for generating that pressure is e.g. 14 N.

Note that the standard of the connector PL1 and the connector PL2 may be another standard in place of the USB Type-A and HDMI®.

Hardware Configuration of Robot Control Apparatus

Figure 5:
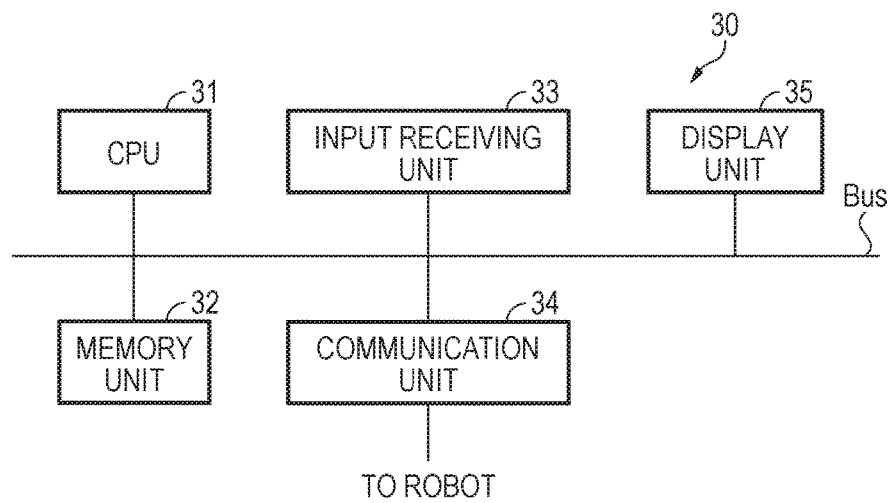
FIG. 5 shows an example of a hardware configuration of a robot control apparatus.

As below, referring to FIG. 5, a hardware configuration of the robot control apparatus 30 will be explained. FIG. 5 shows an example of the hardware configuration of the robot control apparatus 30. The robot control apparatus 30 includes e.g. a CPU (Central Processing Unit) 31, a memory unit 32 that stores respective information, an input receiving unit 33, a communication unit 34, and a display unit 35 that displays respective information. These component elements are communicably connected to one another via a bus Bus. Further, the robot control apparatus 30 communicates with the robot 20 via the communication unit 34.

The CPU 31 executes various programs stored in the memory unit 32.

The memory unit 32 may include e.g. an HDD (Hard Disk Drive), SSD (Solid State Drive), EEPROM (Electrically Erasable Programmable Read-Only Memory), ROM (Read-Only Memory), RAM (Random Access Memory), or the like. Note that the memory unit 32 may be an external memory unit connected via a digital I/O port including USB or the like in place of the unit built in the robot control apparatus 30. The memory unit 32 stores e.g. various kinds of information, programs, etc. to be processed by the robot control apparatus 30.

The input receiving unit 33 is an input device such as e.g. a teaching pendent including a keyboard, mouse, touch pad, etc. Note that the input receiving unit 33 may be integrally formed with the display unit 35 as a touch panel.

The communication unit 34 includes e.g. a digital I/O port such as USB, Ethernet (registered trademark) port, etc.

The display unit 35 is e.g. a liquid crystal display panel or organic EL (ElectroLuminescence) display panel.

Functional Configuration of Robot Control Apparatus

Figure 6:
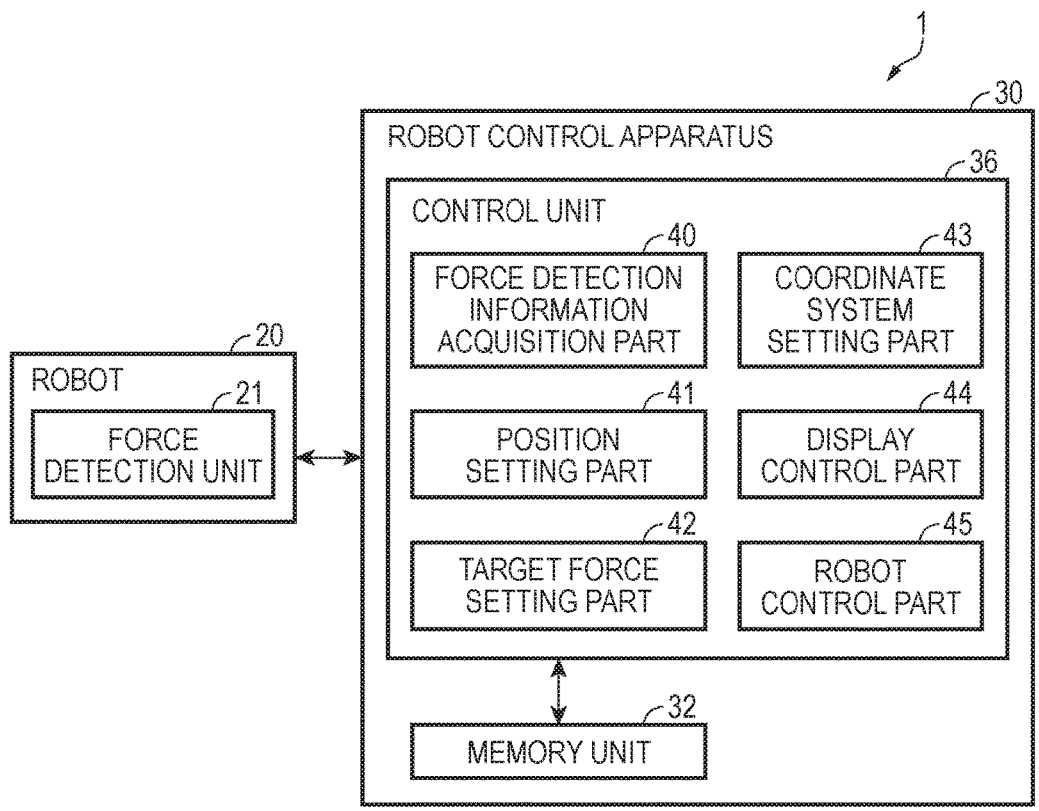
FIG. 6 shows an example of a functional configuration of the robot control apparatus.

As below, a functional configuration of the robot control apparatus 30 will be explained with reference to FIG. 6. FIG. 6 shows an example of the functional configuration of the robot control apparatus. The robot control apparatus 30 includes the memory unit 32 and a control unit 36.

The control unit 36 controls the operations of the respective parts of the robot control apparatus 30 (robot 20). The control unit 36 includes a force detection information acquisition part 40, a position setting part 41, a target force setting part 42, a coordinate system setting part 43, a display control part 44, and a robot control part 45. These functional parts of the control unit 36 are realized by the CPU 31 executing various programs stored in the memory unit 32. Further, part or all of the functional parts may be a hardware functional part such as an LSI (Large Scale Integration) or ASIC (Application Specific Integrated Circuit).

The force detection information acquisition part 40 acquires e.g. force detection information from the force detection unit 21.

The position setting part 41 sets e.g. a first position and a second position, which will be described later. Thereby, various kinds of insertion jobs may be handled and the insertion jobs may be quickly performed.

The target force setting part 42 sets e.g. a first target force and a second target force, which will be described later. Thereby, various kinds of insertion jobs may be handled and the insertion jobs may be quickly performed.

The coordinate system setting part 43 sets e.g. a local coordinate system LC as an example of a coordinate system having an axis along the insertion direction of the first object. Thereby, times taken for teaching by a worker and times for confirmation of teaching results may be shortened.

The display control part 44 allows the display unit 35 to display e.g. the output of the force detection unit 21 and the trajectory of the arm A. Thereby, the detailed condition at the insertion job may be visually confirmed.

The robot control part 45 performs force control or the like on the arm A based on the force detection information acquired by the force detection information acquisition part 40 or the like, for example. That is, the robot control part 45 operates the robot 20 by performing force control based on the force detection information acquired by the force detection information acquisition part 40 or the like, performing position control, and performing force control and position control based on the force detection information or the like.

The robot control part 45 performs control on the arm A based on insertion positions in which the insertion of the connector PL1 into the insertion portion PL21 was successful and the number of successful times. Thereby, for example, the insertion job may be quickly performed by an attempt to perform the insertion job with the insertion position in which the insertion was successful at many times as the target position.

Processing of Allowing Robot to Perform Insertion Job by Robot Control Apparatus In the robot system 1, the robot 20 is controlled by the robot control apparatus 30 and the insertion job of moving at least one of the connector PL1 and the connector PL2 having the insertion portion PL21 and inserting the connector PL1 into the insertion portion PL21 is performed by the arm A of the robot 20. In the embodiment, in the insertion job, the connector PL1 is moved by the arm A and the connector PL2 is not moved. Further, in the insertion job, the arm A performs an action of moving the connector PL1 to an insertion action start position 60 near the insertion portion PL21 and an insertion action of inserting the connector PL1 into the insertion portion PL21 from the insertion action start position 60. Note that, in the specification, "insertion" is used in a broad concept including fitting (fitting in), screwing (screwing in), joining, coupling, etc. Therefore, depending on the configuration of the insertion portion, "insertion" may be read as "joining" or "coupling". The connector PL1 is an example of the first object. Further, the connector PL2 is an example of the second object.

Next, the control of the robot control apparatus 30 and the action of the robot 20 in the insertion job will be explained. Prior to the explanation, an example of teaching of the robot 20 will be explained with reference to FIGS. 8 to 11.

In the teaching of the robot 20, first, the connector PL1 is grasped by the end effector E, the arm A is driven and the connector PL1 is moved, and the attention point T of the connector PL1 is positioned in the insertion action start position 60 near the insertion portion PL21 of the connector PL2 as shown in FIG. 8. For example, a user performs the job by visually and manually operating the robot control apparatus 30 to allow the robot 20 to act.

Further, the local coordinate system LC (user coordinate system) is set. The local coordinate system LC is an example of the coordinate system having the axis along the insertion direction of the connector PL1. In the embodiment, the local coordinate system LC is a three-dimensional local coordinate system having the axis along the insertion direction of the connector PL1 as a Z-axis and the positive direction of the insertion direction as the positive direction of the Z-axis (Z-direction plus side).

In the embodiment, the origin of the local coordinate system LC is set to a current tool center point TCP of the robot 20 (see FIG. 7), i.e., a fixed position in the position of the center of the end of the end effector E. That is, the local coordinate system LC is not displaced even when the robot 20 acts. The local coordinate system LC is set so that the positive direction of the Z-axis in the local coordinate system LC may coincide with the positive direction of the Y-axis in the robot coordinate system RC, the positive direction of the X-axis in the local coordinate system LC may coincide with the positive direction of the Z-axis in the robot coordinate system RC, and the positive direction of the Y-axis in the local coordinate system LC may coincide with the positive direction of the X-axis in the robot coordinate system RC. Hereinafter, the local coordinate system LC is used.

The local coordinate system LC is set, and thereby, times taken for teaching by the worker and times for confirmation of teaching results may be shortened. Note that the local coordinate system LC is an example of the coordinate system having the axis along the insertion direction of the connector PL1.

A predetermined part of the arm A when the attention point T of the connector PL1 is located in the insertion action start position 60, in the embodiment, the coordinates of the tool center point TCP are stored in the memory unit 32. Thereby, the insertion action start position 60 is registered. In other words, the insertion action start position 60 is set. Note that, in place of the tool center point TCP, e.g. the coordinates of the attention point T may be stored.

Then, the arm A is driven and the connector PL1 is moved, and the connector PL1 is positioned in a first position 61 of the insertion portion PL21 as shown in FIG. 9. For example, the user performs the job by visually and manually operating the robot control apparatus 30 to allow the robot 20 to act. Further, in the job, a force in the X-direction and a force in the Y-direction are detected by the force detection unit 21, and the force in the X-direction and the force in the Y-direction detected by the force detection unit 21 are respectively adjusted to be values of zero or close to zero.

Further, the predetermined part of the arm A when the attention point T of the connector PL1 is located in the first position 61, in the embodiment, the coordinates of the tool center point TCP are stored in the memory unit 32. Thereby, the first position 61 is registered. In other words, the first position 61 is set. Note that, in place of the tool center point TCP, e.g. the coordinates of the attention point T may be stored.

Then, the arm A is driven and the connector PL1 is moved, and the connector PL1 is positioned in a third position 63 of the insertion portion PL21 as shown in FIG. 11. The third position 63 is the deepest position of the insertion portion PL21 where the insertion is completed. For example, the user performs the job by visually and manually operating the robot control apparatus 30 to allow the robot 20 to act. In this case, the movement of the connector PL1 to the third position 63 is made by movement of the connector PL1 from the first position toward the Z-direction plus side based on the detection result of the force detection unit 21. That is, if the force in the Z-direction detected by the force detection unit 21 exceeds a predetermined threshold value, a determination that the connector PL1 has reached the third position 63 is made.

Further, the predetermined part of the arm A when the attention point T of the connector PL1 is located in the third position 63, in the embodiment, the coordinates of the tool center point TCP are stored in the memory unit 32. Thereby, the third position 63 is registered. In other words, the third position 63 is set. Note that, in place of the tool center point TCP, e.g. the coordinates of the attention point T may be stored.

Then, the arm A is driven and the connector PL1 is moved, and the attention point T of the connector PL1 is positioned in a second position 62 of the insertion portion PL21 as shown in FIG. 10. The second position 62 is located in the positive direction of the insertion direction of the connector PL1 with respect to the first position 61, i.e., on the Z-direction plus side with respect to the first position. For example, the user performs the job by visually and manually operating the robot control apparatus 30 to allow the robot 20 to act. In this case, the movement of the connector PL1 to the second position 62 is made by movement of the connector PL1 from the third position 63 toward the Z-direction minus side.

Further, the predetermined part of the arm A when the attention point T of the connector PL1 is located in the second position 62, in the embodiment, the coordinates of the tool center point TCP are stored in the memory unit 32. Thereby, the second position 62 is registered. In other words, the second position 62 is set. Note that, in place of the tool center point TCP, e.g. the coordinates of the attention point T may be stored.

Next, the control of the robot control apparatus 30 and the action of the robot 20 in the insertion job will be explained.

Figure 14:
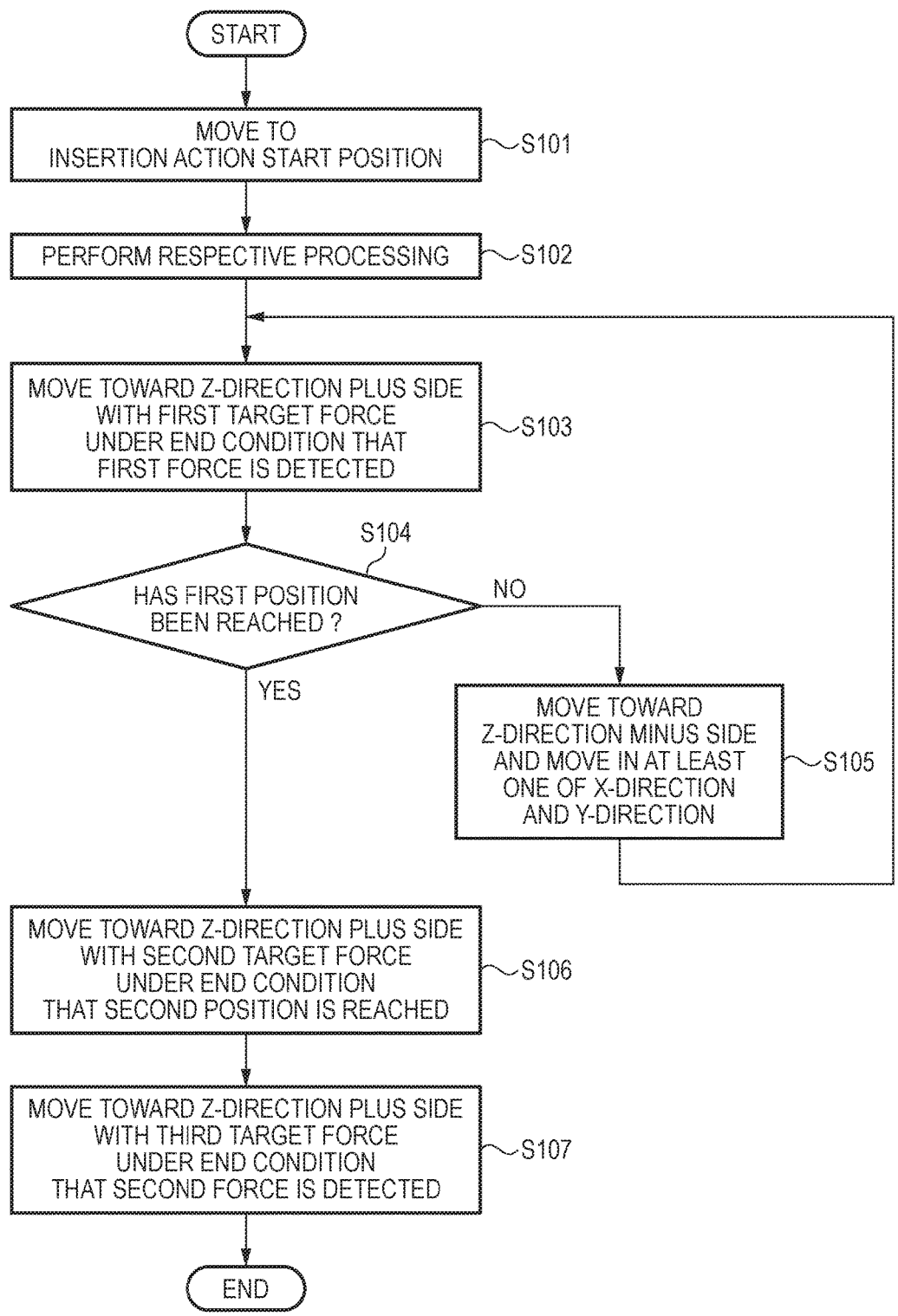
FIG. 14 is a flowchart showing a control operation by the robot control apparatus in the insertion job.

FIGS. 7 to 11 are diagrams for explanation of the action of the robot in the insertion job. FIG. 14 is a flowchart showing a control operation by the robot control apparatus in the insertion job.

Note that, in FIGS. 8 to 11, the illustration of the robot 20 is omitted. Further, in FIGS. 8 to 11, the local coordinate system LC is shown with the position of the origin shifted toward the Z-direction minus side of the local coordinate system LC.

In the insertion job, the robot control apparatus 30 controls the robot 20, and the robot 20 grasps the connector PL1 using the end effector E of the arm A, drives the arm A to move the connector PL1, and inserts the connector PL1 into the insertion portion PL21 of the connector PL2.

In the insertion job, the arm A performs an action of moving the connector PL1 to the insertion action start position 60 near the insertion portion PL21 and the insertion action of inserting the connector PL1 into an insertion portion PL21 from the insertion action start position 60.

Further, in the insertion job, the robot control apparatus 30 performs first control, second control, third control, and fourth control in this order. Note that the first control is performed in the action of moving the connector PL1 to the insertion action start position 60, and the second control, the third control, and the fourth control are performed in the insertion action. Further, the local coordinate system LC is respectively used in the second control, the third control, and the fourth control.

In the case where the robot 20 performs the insertion job, the robot control part 45 performs force control on the arm A at least in a part of the insertion job.

In the embodiment, the force control is performed on the arm A from start to end of the insertion job in a section (period) from when the attention point T of the connector PL1 is positioned in the insertion action start position 60 to when the point is positioned in the third position 63. That is, force control and position control are respectively performed in the second control, the third control, and the fourth control.

In at least a part of the insertion job, not only the force control but also force control and position control are performed. Thereby, a part for which force control and position control are performed, a part for which force control is performed, and apart for which position control is performed are provided according to conditions, and the insertion job may be quickly performed.

In the embodiment, force control and position control are performed on the arm A from start to end of the insertion job in a section from when the attention point T of the connector PL1 is positioned in the first position 61 of the insertion portion PL21 to when the point is positioned in the third position 63. That is, force control and position control are respectively performed in each of the second control and the third control. As below, the details will be explained with reference to FIGS. 7 to 11 and 14.

Figure 7:
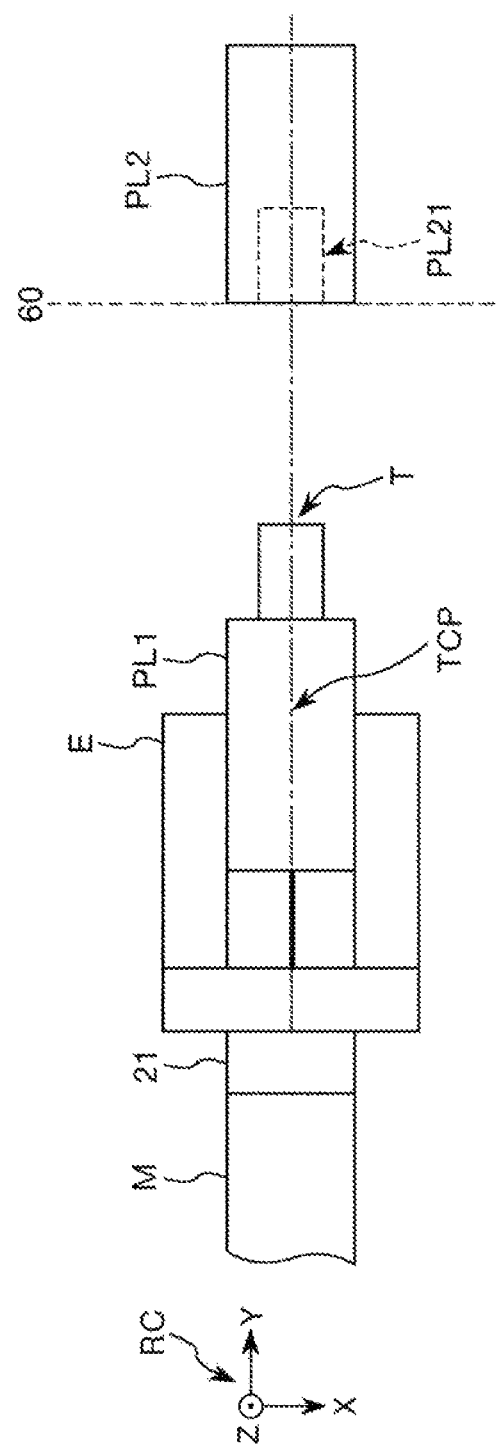
FIG. 7 is a diagram for explanation of an action of a robot in an insertion job.

As shown in FIG. 7, before the insertion job, the attention point T of the connector PL1 is apart from the insertion action start position 60.

In the insertion job, first, the first control is performed. As shown in FIG. 8, in the first control, position control is performed on the arm A, and the first action of moving the attention point T of the connector PL1 to the insertion action start position 60 is performed (step S101 in FIG. 14).

Then, respective processing, e.g. reset of the force detection unit 21 etc. is performed (step S102 in FIG. 14).

Then, the second control is performed. As shown in FIG. 9, in the second control, force control and position control are performed on the arm A, and the second action of moving the attention point T of the connector PL1 to the intermediate position of the insertion portion PL21, i.e., the first position 61 is performed.

In the second action, the first target force is set as a target force of the force control and the connector PL1 is moved toward the Z-direction plus side with the first target force under an end condition that the first force (e.g. 10 N) is detected by the force detection unit 21 (step S103 in FIG. 14).

Then, whether or not the attention point T of the connector PL1 has reached the first position 61 is determined (step S104 in FIG. 14), if a determination that the point has not reached the position is made, position control is performed on the arm A, and the connector PL1 is moved by a predetermined distance (e.g. 0.5 mm) toward the Z-direction minus side and further moved by a predetermined distance (e.g. 0.25 mm) at least in one direction of the X-direction and the Y-direction (step S105 in FIG. 14). Thereby, a preparation for retry is completed. Note that, in the embodiment, the connector is moved in the Y-direction of the X-direction and the Y-direction. Then, returning to step S103 in FIG. 14, step S13 and the subsequent steps are executed again.

If a determination that the attention point T has reached the first position 61 is made at step S104 in FIG. 14, the process moves to step S106 in FIG. 14.

As described above, if it is impossible to position the attention point T of the connector PL1 in the first position by the single second action, the second action is performed at many times until the attention point T is positioned in the first position 61.

Thereby, the attention point T of the connector PL1 is located in the first position 61, and the insertion action is continued.

As described above, in the second control, in the insertion job, when the robot control part 45 moves at least one of the connector PL1 and the connector PL2 in the direction in which the connector PL1 and the connector PL2 come closer and determines that the connector PL1 comes into contact with a position different from the insertion portion PL21 based on the output of the force detection unit 21, the part moves at least one of the connector PL1 and the connector PL2 in the direction in which the connector PL1 and the connector PL2 separate.

Thereby, when the connector PL1 comes into contact with a position different from the insertion portion PL21, damage and deformation of the connector PL1 and the connector PL2 may be suppressed.

The force control of the second control is force control for the arm A to position the connector PL1, in the embodiment, the attention point T in the first position 61. Further, the first target force of the force control is not particularly limited, but appropriately set according to conditions.

In at least a part of the insertion job, a force that cancels the force subjected to the connector PL1 from the insertion portion PL21 is added to the target force of the force control. In the embodiment, in the respective second control and third control and fourth control to be described later, a force that cancels the force subjected to the connector PL1 from the insertion portion PL21 is added to the target force of the force control. That is, a force toward the X-direction plus side is subjected to the connector PL1 from the insertion portion PL21, and a force toward the X-direction minus side that cancels the force is added to the target force of the force control. Thereby, the insertion action may be smoothly performed, the insertion action may be performed at a higher speed with a smaller force, and the insertion action may be quickly performed.

Then, the third control is performed. As shown in FIG. 10, in the third control, force control and position control are performed on the arm A, and the third action of moving the attention point T of the connector PL1 to the intermediate position of the insertion portion PL21, i.e., the second position 62 is performed.

In the third action, the second target force is set as a target force of the force control and the connector PL1 is moved toward the Z-direction plus side with the second target force under an end condition that the connector has reached the second position 62 (step S106 in FIG. 14). Further, in the third action, an operation (control) of moving the connector PL1 along the X-direction and the Y-direction with respect to the insertion portion PL21 is also performed.

Thereby, the attention point T of the connector PL1 is located in the second position 62 of the insertion portion PL21, and the insertion action is continued.

As described above, the force control of the third control is force control for the arm A to position the connector PL1, in the embodiment, the attention point T in the second position 62. Further, the second target force of the force control is not particularly limited, but appropriately set according to conditions, and, in the embodiment, the first target force and the second target force are different. In the embodiment, the second target force is larger than the first target force. Thereby, the movement of the attention point T from the first position 61 to the second position 62 may be performed at a high speed, and the insertion job may be quickly performed.

The distance in the Z-direction between the first position 61 and the second position 62 is longer than the distance in the Z-direction between the insertion action start position 60 and the first position 61. Thereby, in a section having a long distance, the connector PL1 may be moved at a high speed and the insertion job may be quickly performed.

Then, the fourth control is performed. As shown in FIG. 11, in the fourth control, force control is performed on the arm A, and the fourth action of moving the attention point T of the connector PL1 to the deepest part of the insertion portion PL21, i.e., the third position 63 is performed.

In the fourth action, the third target force is set as a target force of the force control and the connector PL1 is moved toward the Z-direction plus side with the third target force under an end condition that the second force (e.g. 22 N) is detected by the force detection unit 21 (step S107 in FIG. 14).

Thereby, the attention point T of the connector PL1 is positioned in the deepest part of the insertion portion PL21. Then, the robot 20 releases the connector PL1 grasped with the end effector E and ends the insertion job.

As described above, the force control of the fourth control is force control for the arm A to position the connector PL1, in the embodiment, the attention point T in the third position 63. Further, the third target force of the force control is not particularly limited, but appropriately set according to conditions. When the third target force is set to a large value, the insertion action may be performed at a high speed. Or, when the third target force is set to a small value, the fourth action may be carefully performed and damage and deformation of the connector PL1 and the connector PL2 may be suppressed.

Note that, in the embodiment, in the insertion job, the robot 20 is adapted to grasp the connector PL1 and move the connector PL1, however, not limited to that. For example, the robot 20 may be adapted to grasp the connector PL2 and move the connector PL2.

Further, for example, a dual-arm robot (or a multi-arm robot having three or more arms) may be employed as the robot 20, and the robot may be adapted to grasp the connector PL1 with one arm and grasp the connector PL2 with the other arm in the insertion job. In this case, the robot may be adapted to move only the connector PL1, may be adapted to move only the connector PL2, or may be adapted to move the connectors PL1 and PL2.

That is, in the insertion job, it is only necessary that the robot 20 is adapted to relatively move the connector PL1 and the connector PL2.

Description of Display

Figure 12:
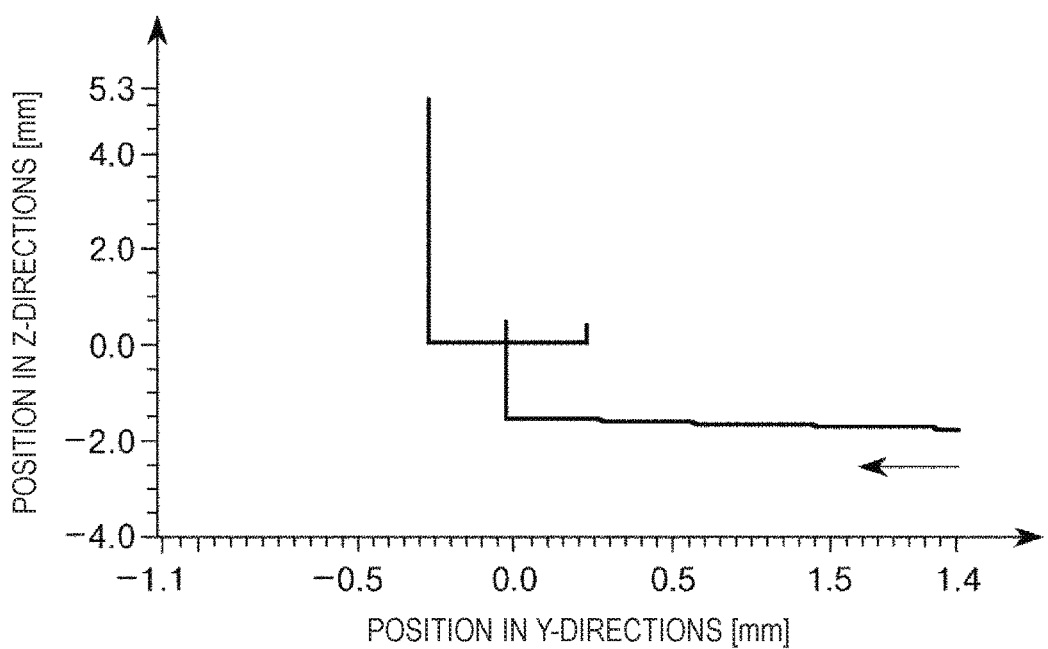
FIG. 12 is a graph showing a trajectory of a tool center point of the robot when an experiment of the insertion job is performed.

FIG. 12 is a graph showing a trajectory of the tool center point of the robot when an experiment of the insertion job is performed.

The graph can be respectively displayed on the display unit 35 under the control of the display control part 44 at teaching, adjustment, actual action, etc. of the robot 20. Thereby, the trajectory of the tool center point TCP of the robot 20 may be visually recognized and the convenience is high.

Note that the horizontal axis of the graph shown in FIG. 12 indicates the position of the tool center point TCP in the Y-direction and the vertical axis indicates the position of the tool center point TCP in the Z-direction.

As shown in FIG. 12, in the insertion job, the tool center point TCP of the robot 20 first moved toward the Y-direction minus side and moved toward the Z-direction plus side in the position having the coordinate in the Y-direction of about 0 mm. However, the position was different there and the attention point T did not reach the first position 61.

Then, the tool center point TCP moved toward the Z-direction minus side, then, moved toward the Y-direction plus side, and moved toward the Z-direction plus side in the position having the coordinate in the Y-direction of about 0.25 mm. However, the position was different there and the attention point T did not reach the first position 61.

Then, the tool center point TCP moved toward the Z-direction minus side, then, moved toward the Y-direction minus side, and moved toward the Z-direction plus side in the position having the coordinate in the Y-direction of about −0.25 mm. The position was correct there and the attention point T reached the first position 61. The subsequent explanation is omitted.

Figure 13:
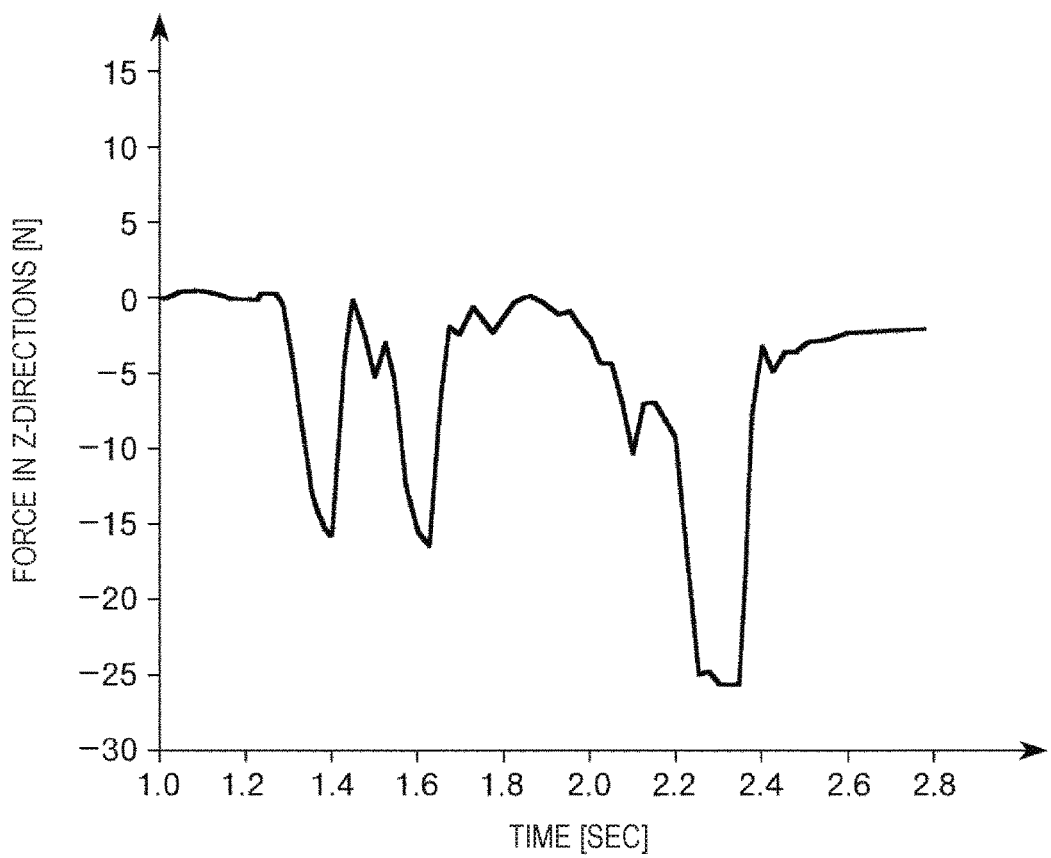
FIG. 13 is a graph showing a force in the Z-directions detected by a force detection unit when the experiment of the insertion job shown in FIG. 12 is performed.

FIG. 13 is a graph showing a force in the Z-directions detected by the force detection unit when the experiment of the insertion job shown in FIG. 12 is performed.

The graph can be respectively displayed on the display unit 35 under the control of the display control part 44 at teaching, adjustment, actual action, etc. of the robot 20. Thereby, the force in the Z-directions detected by the force detection unit 21 of the robot 20 can be visually recognized and the convenience is high.

Note that the horizontal axis of the graph shown in FIG. 13 indicates time and the vertical axis indicates the force in the Z-direction detected by the force detection unit.

As shown in FIG. 13, in the insertion job, the robot 20 was respectively in different positions when the coordinate in the Y-direction was about 0 mm, i.e., when the time was about 1.4 seconds and when the coordinate in the Y-direction was about 0.25 mm, i.e., when the time was about 1.6 seconds, and the attention point T did not reach the first position 61.

When the coordinate in the Y-direction was about −0.25 mm, i.e., when the time was about 1.75 seconds, the attention point T reached the first position 61. Then, the absolute value of the force in the Z-directions detected by the force detection unit 21 overshot "20 N" as the second target force by about 5 N, and then, decreased.

As described above, in the robot system 1, even when the second target force is set to a relatively large value, the absolute value of the force in the Z-directions detected by the force detection unit 21 largely over the second target force may be suppressed. Thereby, the insertion job may be quickly performed. Further, it is also known that the time taken for the insertion job is shorter.

Description of Memory of History Etc. of Insertion Job of Robot Control Apparatus The robot control apparatus 30 correlates and stores the insertion positions in which the insertion of the connector PL1 into the insertion portion PL21 was successful and the number of successful times in the memory unit 32 in the insertion job.

Then, the robot control part 45 of the robot control apparatus 30 performs control on the arm A based on the insertion positions in which the insertion of the connector PL1 into the insertion portion PL21 was successful and the number of successful times. That is, in the insertion job, the connector PL1 is inserted into the insertion position in which the insertion of the connector PL1 into the insertion portion PL21 was successful at the largest number times. Further, the robot control part 45 performs position control on the arm A when the connector PL1 is moved to the insertion position in which the insertion of the connector PL1 into the insertion portion PL21 was successful at the largest number times. Thereby, it is expected that the insertion of the connector PL1 is successful in the position to which the connector PL1 has been moved, and the insertion job may be quickly performed.

As described above, according to the robot system 1, a section in which force control and position control are performed, a section in which force control is performed, and a section in which position control is performed are provided and the optimal target forces are set in the force control, and thereby, the insertion job may be quickly and properly performed.

Modified Examples of Method of Grasping Connector PL1 by End Effector of Robot

As below, referring to FIGS. 15 to 17, modified examples of the method of grasping the connector PL1 by the end effector E of the robot 20 will be explained.

Figure 15:
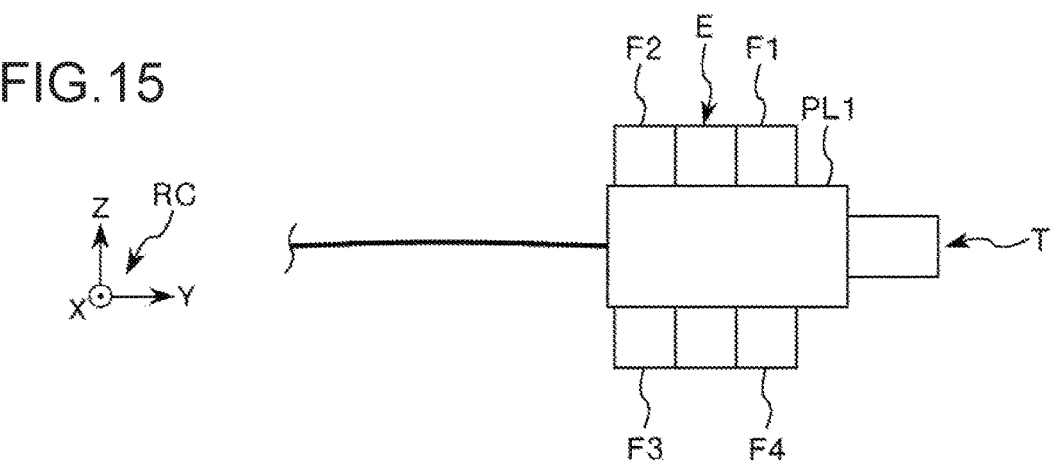
FIG. 15 is a side view showing another example when the connector PL1 grasped by the end effector is seen from the positive direction in the negative direction of the X-axis in the robot coordinate system RC.

FIG. 15 is a side view showing another example when the connector PL1 grasped by the end effector is seen from the positive direction in the negative direction of the X-axis in the robot coordinate system RC. In the side view, the positive direction of the Z-axis in the attention point coordinate system coincides with the positive direction of the Y-axis in the robot coordinate system RC. Further, in the side view, the rotation axis of the joint for rotating the end effector E of the joints of the manipulator M and the X-axis in the robot coordinate system RC coincide.

In the example shown in FIG. 15, the end effector E operates the respective fingers F1 to F4 to pinch the connector PL1 from the gravity direction and the opposite direction to the gravity direction, and thereby, grasps the connector PL1. In the example, the gravity direction is the negative direction of the Z-axis in the robot coordinate system RC. That is, the end effector E moves the fingers F1 and F2 in the gravity direction closer to the connector PL1 and moves the fingers F3 and F4 in the opposite direction closer to the connector PL1, and thereby, pinches the connector PL1 by the respective fingers F1 to F4 and grasps the connector PL1. Accordingly, in the example shown in FIG. 15, the fingers F1 and F2 are in contact with the part on the positive direction side of the Z-axis of the parts of the connector PL1, and the fingers F3 and F4 are in contact with the part on the negative direction side of the Z-axis of the parts of the connector PL1.

Thereby, the robot 20 may suppress a shift in the gravity direction of the relative relationship between the end effector E as the part that pinches the connector PL1 of the parts of the robot 20 and the connector PL1 due to the weight of the connector PL1 and the weight of the cable of the connector PL1.

Figure 16:
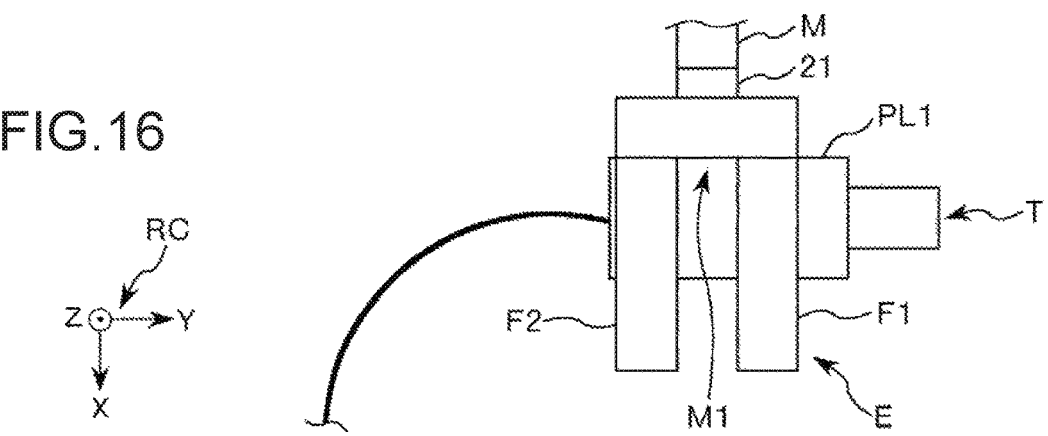
FIG. 16 is a top view of an example when the end effector and the connector PL1 shown in FIG. 15 are seen from the positive direction in the negative direction of the Z-axis directions in the robot coordinate system RC.

FIG. 16 is a top view of an example when the end effector and the connector PL1 shown in FIG. 15 are seen from the positive direction in the negative direction of the Z-axis directions in the robot coordinate system RC. As shown in FIG. 16, the end effector E brings a surface M1 as a surface on which the respective fingers F1 to F4 are provided of the surfaces of the end effector E into contact with a surface on the negative direction side of the X-axis in the robot coordinate system RC of the surfaces of the connector PL1, and thereby, grasps the connector PL1 in a restricted state in directions orthogonal to the gravity direction.

Thereby, the robot 20 may suppress a shift in the directions orthogonal to the gravity direction of the relative position relationship between the end effector E as the part that pinches the connector PL1 of the parts of the robot 20 and the connector PL1 and suppress a shift in the gravity direction of the position relationship.

Figure 17:
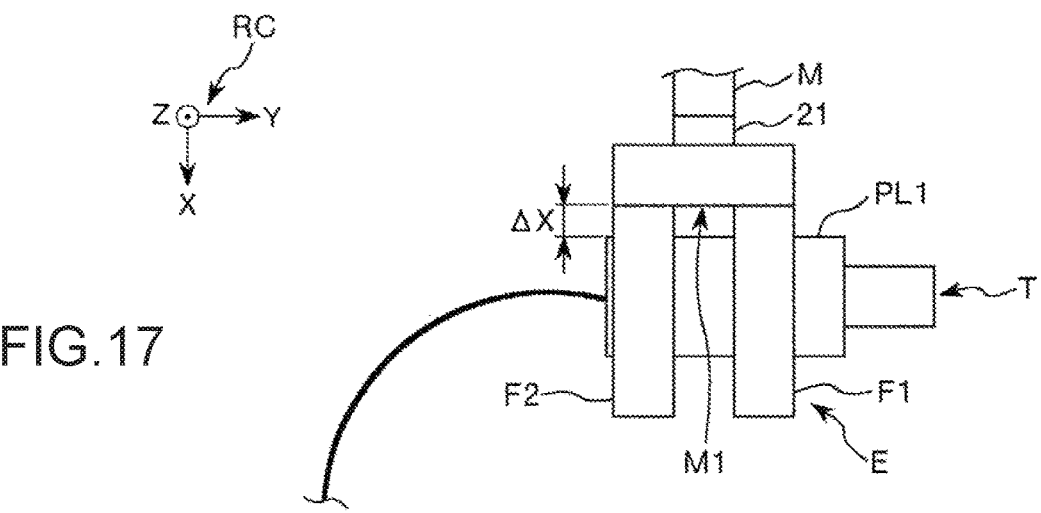
FIG. 17 is a top view of another example when the end effector and the connector PL1 shown in FIG. 15 are seen from the positive direction in the negative direction of the Z-axis directions in the robot coordinate system RC.

Note that the end effector E may be adapted not to bring the surface M1 into contact with the surface on the negative direction side of the X-axis in the robot coordinate system RC of the surfaces of the connector PL1 when grasping the connector PL1 as shown in FIG. 17.

FIG. 17 is a top view of another example when the end effector and the connector PL1 shown in FIG. 15 are seen from the positive direction in the negative direction of the Z-axis directions in the robot coordinate system RC. In the example shown in FIG. 17, there is a gap having a distance ΔX between the surface M1 and the surface on the negative direction side of the X-axis in the robot coordinate system RC of the surfaces of the connector PL1. Note that FIG. 17 shows the case where the surface M1 and the surface on the negative direction side of the X-axis in the robot coordinate system RC of the surfaces of the connector PL1 are parallel, however, these surfaces are not necessarily in parallel. The example in which these surfaces are not parallel, but orthogonal is the example shown in FIGS. 2 and 3. As these surfaces come closer to the state (orthogonal state) shown in FIGS. 2 and 3 from the state (parallel state) shown in FIG. 17, even when another object is located near the entrance of the insertion portion PL21 of the connector PL2 and the part around the entrance is narrower, the robot 20 may insert the connector PL1 into the insertion portion PL21 without contact between the end effector E and the object.

Note that the method of grasping the connector PL1 by the end effector E of the robot 20 is preferably the method of pinching the connector PL1 from the gravity direction and the opposite direction to the gravity direction, but the method may be another method than the methods described as above. For example, the method of grasping the connector PL1 by the end effector E of the robot 20 may be a method of grasping the connector PL1 from the positive direction in the negative direction of the Z-axis in the robot coordinate system RC using an end effector that can surround and hold the connector PL1. Or, the method of grasping the connector PL1 by the end effector E of the robot 20 may be a method of restricting the movement of the connector PL1 in the gravity direction using a part that can support the connector PL1 from the negative direction in the positive direction of the Z-axis in the robot coordinate system RC when lifting the connector PL1 using an end effector that suctions the connector PL1 by air or magnetic force. The part may be a part of the end effector or a part different from the end effector.

As above, the robot control apparatus, the robot and robot system are described based on the illustrated embodiments, however, the invention is not limited to those. The configurations of the respective parts may be replaced by arbitrary configurations having the same functions. Or, another arbitrary configuration may be added thereto.

A program for realizing a function of an arbitrary configuration part in the above described apparatus (e.g. the robot control apparatus 30) may be recorded in a computer-readable recording medium and the program may be read into a computer system and executed. Note that "computer system" here includes an OS (Operating System) and hardware such as a peripheral. Further, "computer-readable recording medium" refers to a portable medium such as a flexible disk, magnetooptical disk, ROM, CD (Compact Disk)-ROM and a storage device such as a hard disk built in the computer system. Furthermore, "computer-readable recording medium" includes a medium that holds a program in a fixed period such as a volatile memory (RAM) within the computer system serving as a server or client when the program is transmitted via a network such as the Internet or a communication line such as a phone line.

The program may be transmitted from the computer system in which the program is stored in a memory device or the like via a transmission medium or transmission wave within the transmission medium to another computer system. Here, "transmission medium" for transmission of the program refers to a medium having a function of transmitting information including a network (communication network) such as the Internet and a communication line such as a phone line.

Further, the program may be for realizing part of the above described function. Furthermore, the program may be for realizing the above described function in combination with a program that has been already recorded in the computer system, the so-called differential file (differential program).

The entire disclosure of Japanese Patent Application No. 2016-144626, filed Jul. 22, 2016 is expressly incorporated by reference herein.

What is claimed is:

1. A robot control apparatus that controls a robot having a movable part in which a force detection unit is provided, comprising a robot control part that performs force control on the movable part based on output of the force detection unit,
wherein, when an insertion job of moving at least one of a first object and a second object having an insertion portion and inserting the first object into the insertion portion is performed by the movable part, the robot control part performs the force control on the movable part at least in a part of the insertion job, and
a first target force of the force control for the movable part to position the first object in a first position and a second target force of the force control for the movable part to position the first object in a second position different from the first position are different.

2. The robot control apparatus according to claim 1, further comprising a position setting part that sets the first position and the second position.

3. A robot comprising a movable part in which a force detection unit is provided, and controlled by the robot control apparatus according to claim 2.

4. A robot system comprising:
the robot control apparatus according to claim 2; and
the robot controlled by the robot control apparatus.

5. The robot control apparatus according to claim 1, further comprising a target force setting part that sets the first target force and the second target force.

6. A robot comprising a movable part in which a force detection unit is provided, and controlled by the robot control apparatus according to claim 5.

7. A robot system comprising:
the robot control apparatus according to claim 5; and
the robot controlled by the robot control apparatus.

8. The robot control apparatus according to claim 1, wherein the force control and position control are performed in at least a part of the insertion job.

9. A robot comprising a movable part in which a force detection unit is provided, and controlled by the robot control apparatus according to claim 8.

10. A robot system comprising:
the robot control apparatus according to claim 8; and
the robot controlled by the robot control apparatus.

11. The robot control apparatus according to claim 1, wherein the second position is located in a positive direction of an insertion direction of the first object with respect to the first position, and
the second target force is larger than the first target force.

12. A robot comprising a movable part in which a force detection unit is provided, and controlled by the robot control apparatus according to claim 11.

13. A robot system comprising:
the robot control apparatus according to claim 11; and
the robot controlled by the robot control apparatus.

14. The robot control apparatus according to claim 1, wherein a force that cancels a force subjected to the first object from the insertion portion is added to a target force of the force control in at least a part of the insertion job.

15. The robot control apparatus according to claim 1, further comprising a coordinate system setting part that sets a coordinate system having an axis along an insertion direction of the first object.

16. The robot control apparatus according to claim 1, further comprising a display control part that displays output of the force detection unit and a trajectory of the movable part in a display unit.

17. The robot control apparatus according to claim 1, wherein, in the insertion job, when moving at least one of the first object and the second object in a direction in which the first object and the second object come closer using the movable part and determining that the first object has come into contact with a position different from the insertion portion based on output of the force detection unit, the robot control part moves at least one of the first object and the second object in a direction in which the first object and the second object separate using the movable part.

18. The robot control apparatus according to claim 1, wherein the robot control part performs control on the movable part based on insertion positions in which insertion of the first object into the insertion portion was successful and the number of successful times.

19. A robot comprising a movable part in which a force detection unit is provided, and controlled by the robot control apparatus according to claim 1.

20. A robot system comprising:
the robot control apparatus according to claim 1; and
the robot controlled by the robot control apparatus.

* * * * *